United States Patent [19]
Gray

[11] 3,918,186
[45] Nov. 11, 1975

[54] WHEEL MOUNTED DISPLAY DEVICE

[76] Inventor: Frank H. Gray, 3007 N. 47th Terrace, Kansas City, Kans. 66104

[22] Filed: May 28, 1974

[21] Appl. No.: 473,881

[52] U.S. Cl. ............................. 40/129 B; 301/37 N
[51] Int. Cl.² ......................................... G09F 21/04
[58] Field of Search ..... 40/129 B, 125 M, 34, 70 R, 40/44, 37, 138, 125 A; 301/37 N, 108 SC

[56] References Cited
UNITED STATES PATENTS

| | | | |
|---|---|---|---|
| 710,195 | 9/1902 | Jones | 40/129 B |
| 1,832,605 | 11/1931 | Zallio | 40/129 B |
| 2,169,237 | 8/1939 | Gasco | 40/129 B |
| 2,869,262 | 1/1959 | Lucas | 40/129 B |
| 2,954,629 | 10/1960 | Matin | 40/129 B |
| 3,260,372 | 7/1966 | Jauslin | 40/138 X |
| 3,769,729 | 11/1973 | Engler | 40/129 B |

*Primary Examiner*—Robert W. Michell
*Assistant Examiner*—John F. Pitrelli
*Attorney, Agent, or Firm*—Schmidt, Johnson, Hovey & Williams

[57] ABSTRACT

An advertising or decorative display device is wheel mounted on a vehicle and has a design bearing panel of substantially rigid sheet material disposed in a normally upright plane with the design in an outwardly facing disposition relative to the wheel. Mounting means concentrically located relative to the wheel assembly receive the panel for free rotation about an axis common with the axis of rotation of the wheel assembly and the panel has a center of gravity located below the common axis of rotation whereby the panel is maintained in a non-rotating condition when the wheel assembly is caused to rotate.

3 Claims, 10 Drawing Figures

U.S. Patent  Nov. 11, 1975  3,918,186
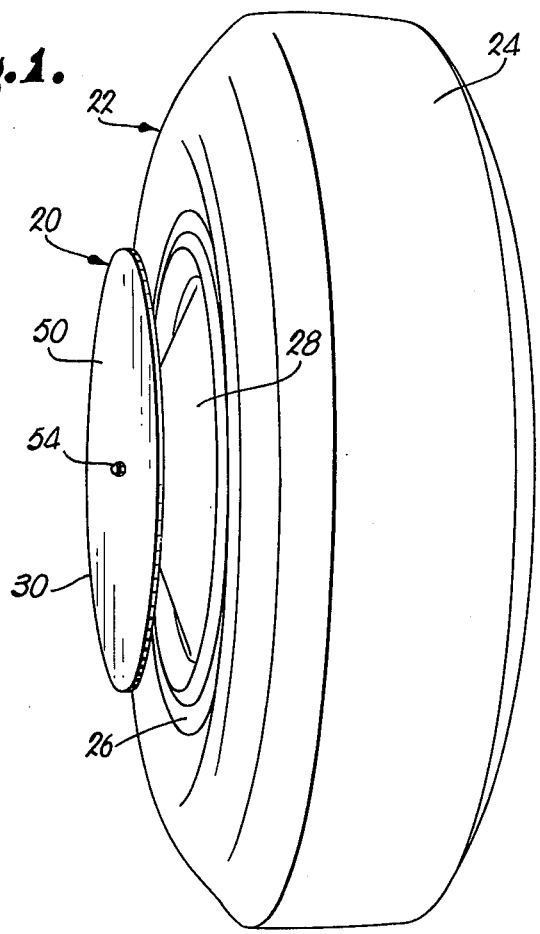
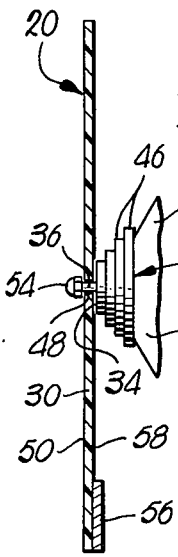
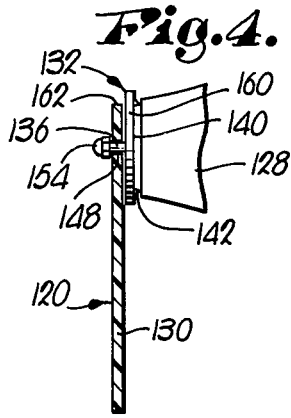
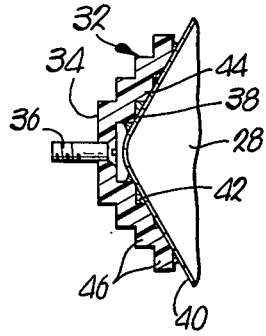
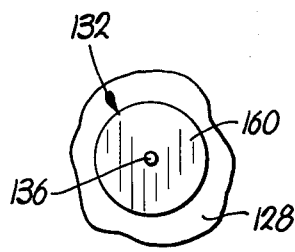
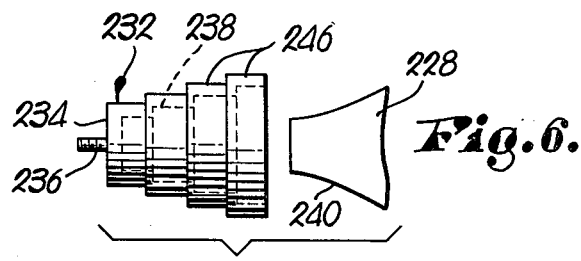
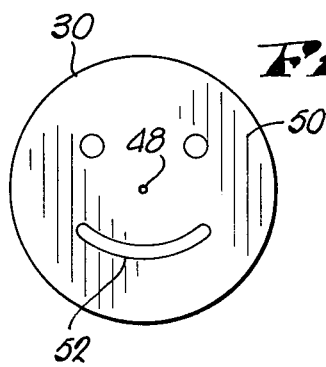
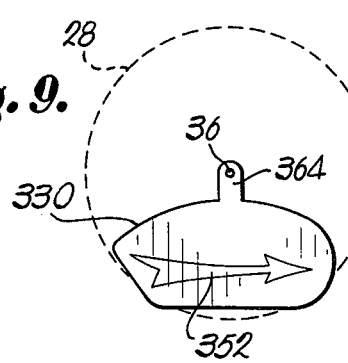
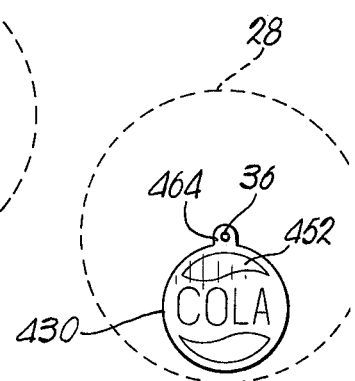
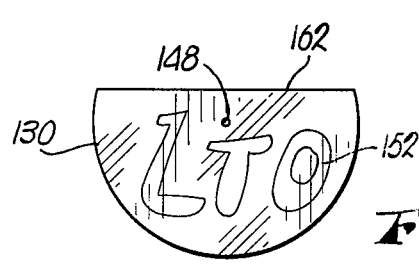

WHEEL MOUNTED DISPLAY DEVICE

This invention relates to a wheel mounted advertising or decorative display device particularly adapted for mounting on a vehicle to present a non-rotating design or the like adjacent a revolving wheel as the vehicle moves along a path of travel.

Accordingly, it is a very important object of my invention to provide a display device that is especially adapted to be mounted adjacent the wheel of a vehicle in such a manner that the design or message on the device is in a non-rotating condition and easily discernable regardless of whether or not the wheel assembly is revolving.

Another very important object of the invention is the provision of a wheel mounted display device which is not only easily observable at all times but is also attention-attracting by virtue of its non-rotating condition relative to its adjacent wheel, yet does not interfere with the normal operation of the vehicle or the wheel.

It is yet another important object of the instant invention to provide a display device that may be readily mounted on the rotating hubcap or hub of a wheel, yet be maintained in a non-rotating condition during rotation thereof.

Yet another significant object of the invention is to provide a mounting means for the display device that is easily adaptable to various styles and sizes of hubcaps and/or wheel hubs.

Yet another object of the invention is to provide a wheel mounted display device in which the mounting means may be permanently secured to the wheel assembly but in which the display panel itself may be readily and easily removed or changed.

In the drawing:

FIG. 1 is a side persepctive view of a wheel mounted display device made pursuant to the present invention as it would appear when mounted on the hubcap of a wheel assembly;

FIG. 2 is a slightly enlarged, fragmentary, elevational view of the display device with a display panel thereof being shown in section and illustrating a first form of the mounting means for securing the panel to a hubcap;

FIG. 3 is a still further enlarged fragmentary, cross-sectional view showing the mounting means of FIG. 2 with the display panel removed therefrom;

FIG. 4 is a fragmentary view, similar to FIG. 2, showing a second form of the mounting means suitable for use with a hubcap having a planar surface and showing, in section, a modified form of the display panel;

FIG. 5 is a fragmentary front view of the mounting means shown in FIG. 4 with the display panel removed;

FIG. 6 is a fragmentary, exploded view of a modification of the first form of the mounting means shown in FIGS. 2 and 3 and particularly adapted for a hubcap having an elongated, shoulder defining section; and FIGS. 9–10 are front elevational views illustrating examples of the various display panel configurations that may be employed to present the display device.

Referring initially to FIGS. 1–3 and 7, there is shown a display device, broadly designated by the numeral 20, adapted to be mounted on a wheeled vehicle (not shown) having a wheel assembly 22 comprised of a tire 24 mounted on a disk and rim unit 26 and a hubcap 28. Generally comprising the display device 20 is a panel of substantially rigid, light weight sheet material, such as plastic, carried by an adaptor member 32 and freely rotatable thereon relative to the wheel assembly 22.

The adaptor member 32 presents a generally frusto-conical, hollow cross-sectional configuration and includes a truncated, closed end 34 through which a threaded fastener 36 projects for receiving the panel 30. The fastener 36 is suitably secured to the member 32 and is concentrically located thereon in an axially projecting manner. The member 32 is provided with a series of concentric internal shoulders 38 adapted to engage the hubcap 28 which presents a generally cone-shaped outer face 40 such that the member 32 is concentrically seated on the outer face 40 when secured thereto.

The member 32 may be secured to the hubcap 28 in any suitable manner, however, it is suggested that a good, high quality adhesive 42 be used which will provide a good bond between the shoulders 38 and the hubcap face 40. If desired, certain of the shoulders 38 may be trimmed, as at 44, to correspond to the angle or slope of the particular hubcap 28 to which the device 20 is attached.

Further, it is contemplated that the member 32 be molded or extruded from a good quality plastic to present a plurality of concentric rings 46 which progressively decrease in diameter as the end 34 is approached. The member 32 may be made for universal adaptation to various hubcaps by having a plurality of such rings 46 which could be trimmed to correspond to the contour of its associated hubcaps or by actually removing the necessary number of rings to assure proper fit as shown in FIG. 3.

The panel 30 may be of any suitable size or configuration and, in the particular form shown in FIGS. 1–3 and 7, it is circular in shape and has an aperture 48 centrally disposed therein for receiving the fastener 36. An outer surface 50 bears an advertising or decorative design 52 thereon in an outwardly facing disposition relative to the wheel assembly 22. The aperture 48 is slightly oversized with respect to the diameter of the fastener 36 in order that the panel might be freely rotatable thereon after it has been secured thereto by means of a self-locking nut 54.

Thus, it will be seen, as best shown at FIGS. 1 and 2, that once the panel 30 has been attached to the adaptor member 32 and the same in turn secured to the outer face 40 of the hubcap 28, that the panel 30 will be freely rotatably about an axis common with the axis of rotation of the wheel assembly 22, such axis being typified by the fastener 36. The oversized nature of the aperture 48 permits the adaptor member 32 with its fastener 36 to rotate about their common axes relative to the panel 30. A suitable weight 56 is affixed to the panel 30 on a back side 58 thereof and near the lower periphery thereof to provide the panel 30 with a center of gravity that is located below the axis of rotation of the wheel assembly 22; such offset of the center of gravity being effective to maintain the panel 30 in a non-rotating condition whenever the wheel assembly 22 is caused to rotate. It is to be understood, of course, that the weight 56 is so located relative to the design 50 that the latter is properly oriented visually.

Based on the foregoing description, it will be readily appreciated that a novel and unique wheel-mounted display device has been provided which is very attention-attracting by virtue of the fact that one would normally expect to see the advertising panel rotate in unison with the wheel whenever the latter is caused to rotate rather than to maintain its non-rotating condition during rotation of the wheel. The diameter of the panel 30 may be of any convenient dimension but, preferably, it should be slightly smaller than the diameter of the disk and rim unit 26 to avoid any interference with the operation of the wheel assembly 22, to avoid damage to the panel 30 in the event of a flat tire or to minimize the possibility of damage if the wheel assembly 22 is brought too close to a curb or other type obstruction.

A second form of the invention is shown in FIGS. 4, 5 and 8 wherein a display device 120 is adapted to be affixed to a hubcap 128 that includes a normally upright planar surface 140 perpendicular to the axis of rotation of the wheel assembly and concentric therewith. In this instance, an adaptor member 132 is in the form of a planar surface 140 and carries a concentrically located fastener 136 provided with a corresponding self-locking nut 154 for securing a display panel 130 thereto.

In this particular form of the invention, the display panel 130 is of a generally semi-circular configuration, as best shown in FIG. 8 and is provided with a fastener-receiving aperture 148 located an equal distance from its lateral outer edges and proximal the straight, upper peripheral edge 162 such that the major portion of the panel 130 is located below the point at which it is secured to the member 132 in order that the center of gravity is therebelow. This particular form of the invention shows the panel 130 to be made of a transparent material and bearing indicia 152 in the form of letters or initials rather than a design.

FIG. 6 illustrates another form of the invention with regard to the adaptor member and which is essentially a modification of the first described member 32. In this case, an adaptor member 232 is of a somewhat elongated, generally frustoconical, hollow cross-sectional configuration particularly suited for use in connection with a hubcap 228 or other type hub which presents a somewhat elongated contour presenting a shoulder-like configuration. The manner of securing the adaptor member 132 to the hubcap 228 is virtually the same as that described in the first-mentioned form with the member 32 having a series of concentrically disposed internal shoulders 238 that engage the outer face 240 of the hubcap 228 and a truncated closed end 234 through which a concentrically located fastener 236 projects. Here again, the member 232 is molded or formed to present a series of concentric rings 246 which may be trimmed or selectively removed in order to conform the member 32 to the diameter of the particular hub to which it is to be secured as previously described.

FIGS. 9 and 10 illustrate other forms that the advertising panel may present such as the oblong-shaped panel 330 having a design 352 as shown in FIG. 9. In this instance the panel 330 is disposed below the common axis defined by a corresponding fastener 36, again concentrically located relative to its corresponding wheel assembly, and is provided with an extension arm, having an oversize aperture, which interconnects the panel 330 with the fastener 36 whereby the panel 330 is suspended therefrom.

FIG. 10 shows yet another suggested configuration of the invention wherein a panel 430, having an advertising design 452, is of a circular shape disposed entirely below the common axis of rotation as aforedescribed and typified by the fastener 36; the panel 430 again being interconnected with the fastener 36 by means of an upwardly extending extension arm 464 provided with an oversize fastener-receiving aperture such that the panel 430 depends from the fastener 36 and center of gravity of the panel 430 is below the axis of rotation of the wheel.

Thus, based on the foregoing, it will be readily appreciated that a highly versatile and unique advertising and/or design display device has been provided for mounting adjacent the wheel of a vehicle but is so mounted to maintain the display in a non-rotating condition during the time that the wheel rotates. It is to be understood that various combinations of attaching members and sizes and shapes of panels may be provided depending on the desired configuration and type of hubcap or wheel to which the display device is to be attached.

Having thus described the invention, what is claimed as new and desired to be secured by Letters Patent is:

1. An improved wheel-mounted display device for a wheeled vehicle in which the display device is capable of being universally mounted on substantially all types of automotive hubcaps or the like, said device comprising:
a panel of substantially rigid sheet material having a surface bearing an advertising design or the like thereon; and
mounting means carried by a wheel assembly of the vehicle for receiving and supporting said panel in a normally upright plane with said surface in an outwardly facing disposition relative to the wheel, said mounting means comprising:
a generally frustoconical, hollow body having a truncated, closed end,
said body having an internal configuration suited to permit concentric seating thereof on the outer face of a hubcap;
a laterally, outwardly projecting fastener concentrically located on said body at said closed end;
adhesive means for securing said body on the outer face of the hubcap concentrically therewith and with the wheel assembly when the hubcap is attached thereto such that said fastener rotates about an axis common with the axis of rotation of the wheel assembly; and
an aperture in said panel for loosely receiving said fastener,
said panel being freely rotatable on said fastener,
said panel having a center of gravity located below said common axis of rotation whereby said panel is maintained in a nonrotating condition when the wheel assembly ia caused to rotate.

2. A display device as claimed in claim 1, wherein said body presents a series of concentrically disposed internal shoulders for engagement with the outer face of the hubcap, said shoulders being of a decreasing diameter as said truncated end is approached.

3. A display device as claimed in claim 2, wherein said body is comprised of a plurality of concentric rings which progressively decrease in diameter as the truncated, closed end is approached, said body being made of a readily trimmable material whereby selected ones of said rings may be removed to present said body in a configuration corresponding to a preselected hubcap prior to securement thereto with said adhesive means.

\* \* \* \* \*